United States Patent [19]

Deane

[11] 3,874,472

[45] Apr. 1, 1975

[54] BATTERY POWERED VEHICLE DRIVE

[75] Inventor: Clifford T. Deane, South Charleston, W. Va.

[73] Assignee: West Virginia High Bird Corp., St. Albans, W. Va.

[22] Filed: Jan. 25, 1974

[21] Appl. No.: 436,683

[52] U.S. Cl. .................. 180/65 R, 290/16, 320/61
[51] Int. Cl. .............................................. B60l 11/12
[58] Field of Search ........ 180/65 R, 60, 65 F, 65 A; 290/16, 15, 14, 9, 10, 11, 12, 17; 320/61

[56] References Cited
UNITED STATES PATENTS

| | | | |
|---|---|---|---|
| 1,095,967 | 5/1914 | Lister | 180/65 R UX |
| 1,423,090 | 7/1922 | Delano | 180/65 R UX |
| 1,790,635 | 1/1931 | Arendt | 180/65 R UX |
| 3,499,163 | 3/1970 | Verreault | 290/16 |
| 3,616,872 | 11/1971 | Taylor | 180/65 R |

*Primary Examiner*—David Schonberg
*Assistant Examiner*—Milton L. Smith
*Attorney, Agent, or Firm*—Clarence A. O'Brien; Harvey B. Jacobson

[57] ABSTRACT

Two banks of batteries are alternately charged from a main generator driven by a low power gasoline engine. The battery set disconnected from the generator powered charging section, engerizes a drive motor from which a vehicle is propelled at a speed determined by a motor speed controller. At a lower speed limit, a coast generator driven by a flywheel is enabled to begin charging of the motor energizing battery set under coasting conditions.

6 Claims, 2 Drawing Figures

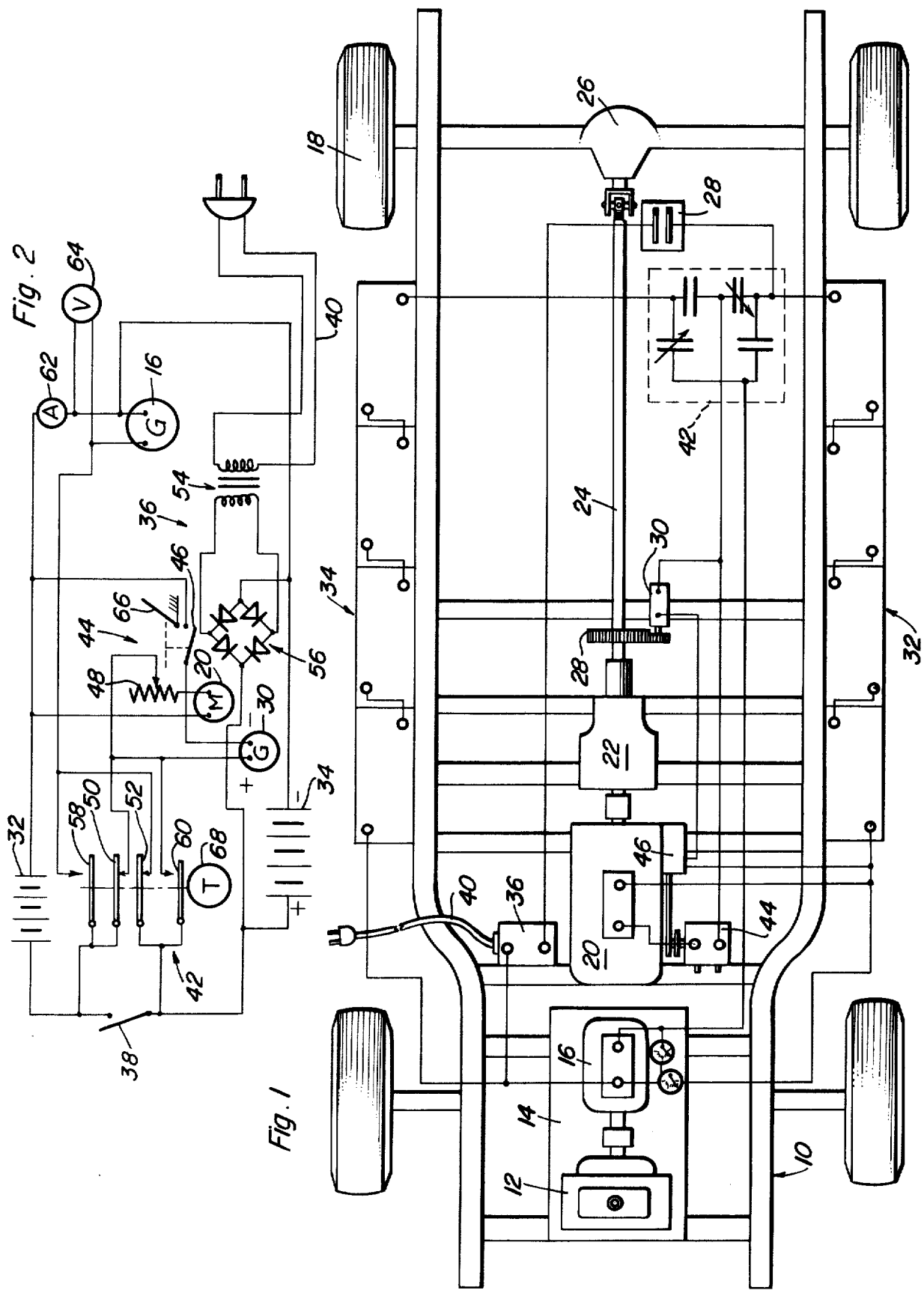

BATTERY POWERED VEHICLE DRIVE

This invention relates to a combined internal combustion and battery operated vehicle drive arrangement.

The present invention combines a low power, fuel combustion engine with a battery charging system to propel an automotive vehicle through a battery operated drive motor. Frequent recharging of the batteries from an external source is thereby avoided so as to provide the vehicle with an effective range of continuous travel. One of the major drawbacks of battery powered vehicle drives is thereby overcome.

In accordance with the present invention, two banks of series connected batteries are periodically switched between operating and charging service. The operating batteries power a vehicle propelling drive motor having a speed controller that enables an auxiliary generator during coast conditions. The charging batteries are charged by a gasoline engine driven generator.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a simplified top plan view of a vehicle frame with the vehicle propelling and power operating system of the present invention installed.

FIG. 2 is an electrical circuit diagram corresponding to the system illustrated in FIG. 1.

Referring now to the drawings in detail, FIG. 1 illustrates a vehicle frame 10 on which the system of the present invention is installed. A low power internal combustion engine 12, such as a 7 horsepower gasoline engine, is mounted on the frame adjacent the forward end on a platform 14 and drives a main DC generator 16. The prime mover for propelling the vehicle through its rear wheels 18 is an electric drive motor 20, such as a 48 volt DC motor. The drive motor is coupled to any suitable automotive transmission 22, the output of which is connected by a propeller shaft 24 to the rear wheel differential gear assembly 26. A flywheel 28 is connected to the propeller shaft and is drivingly connected by gearing to an auxiliary DC coast generator 30.

With continued reference to FIG. 1, battery assemblies 32 and 34 are mounted on the sides of the vehicle frame. Each battery assembly consists of a bank of four storage batteries, for example, interconnected in series. One of the battery assemblies is adapted to energize the drive motor 20 while the other battery assembly is being charged by the main generator 16 through a charging circuit upon closing of a charge switch 38. Alternatively, the battery assemblies may be charged from some external AC source through power cord 40 connected to a converter 36. The battery assemblies are periodically interchanged between drive motor energizing operation and charging condition by a change-over relay assembly 42. The batteries of each assembly may be of a conventional automotive type, wherein epsom salts are added to the fluid therein to maintain the sulphur in suspension longer periods of time.

Vehicle speed is controlled by the driver through a motor speed controller 44 mechanically connected, for example, to the conventional accelerator pedal of the vehicle. The controller 44 is also connected to a switch device 46 through which the auxiliary generator 30 is enabled under coast conditions when the accelerator pedal is released. The output of the auxiliary generator is applied to the operating or discharging batteries to restore some of the charge and may also be used to charge additional accessory operating batteries if desired.

Referring now to FIG. 2, the electrical wiring is illustrated wherein batteries 32 are connected across the input terminals of drive motor 20 in series with the rheostat 48 of the motor controller, through the engaged relay switch 50 in the change-over relay assembly 42. One output terminal of main generator 16, is connected to the negative terminals of both batteries 32 and 34 while the other terminal of the generator is connected by engaged relay switch 52 to the positive terminal of the batteries 34 as shown. The converter 36 includes a voltage step-down transformer 54, the primary winding of which is adapted to be connected to external source through conductors 40 as shown. The secondary winding of the transformer is connected to the input terminals of a full wave rectifier 56. The positive output of rectifier 56 is connected to the positive terminal of batteries 34. Thus, a 115 volt, 30 ampere supply from the external source may be converted to a 38 volt DC charging current of 75 to 100 amperes applied to batteries 34. When the relay switches in the relay assembly 42 are displaced to the other operating positions, relay switches 50 and 52 open and relay switches 58 and 60 close to complete the charging circuit across batteries 32, provided charge switch 38 is also closed, while batteries 34 are connected across the drive motor 20 to energize the same. The output of the generator 16 may be monitored by ammeter 62 and voltmeter 64.

Upon release of the accelerator pedal 66 as diagrammatically shown in FIG. 2, the wiper arm of the rheostat 48 is moved to a limit position reducing the motor speed to idle value and at the same time closes the switch 46 to enable the coast generator 30 by connecting it to the negative terminal of batteries 32 and 34. The positive terminal of the DC generator 30 is connected to the positive terminals of either batteries 32 or 34 through the relay switches 50 and 60. Thus, the generator 30 charges either of the battery assemblies during coast conditions.

Any suitable timer control 68 may be employed to periodically operate the change-over relay assembly in order to obtain a preset ampere-hour rating for the charging of each battery assembly. By switching the battery assemblies between operating and charging service every hour, for example, it is contemplated that a substantially stable current level will be obtained for continuous vehicle driving at speeds up to 50 miles per hour during the life of the batteries. A minimal amount of fuel will be required to drive the main generator 16 through the engine 12, providing a high fuel economy of 150 miles per gallon by way of example.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having an internal combustion engine, a drive propelling transmission and a flywheel driven by the transmission, a drive motor connected to the transmission for propelling the vehicle, generator means driven by the engine for generating a source of electrical energy, at least two energy storing battery assemblies for alternately storing the electrical energy output of the generator means, charging circuit means connected to the generator means for charging one of the battery assemblies while the other of the battery assemblies is energizing the drive motor, an auxiliary generator continuously driven by the flywheel and connected to the charging circuit means, and coast control means connected to the auxiliary generator for enabling the same under coasting conditions of the vehicle to charge one of the battery assemblies.

2. The combination of claim 1 including speed control means connected to the drive motor for increasing the speed thereof from a lower limit, and means interconnecting the speed control means with the coast control means for enabling the auxiliary generator only at said lower limit of the drive motor speed.

3. The combination of claim 1 wherein said charging circuit means includes a change-over switch device interconnecting the battery assemblies with the generator means and the auxiliary generator, and switch actuating means connected to the switch device for periodically interchanging the battery assemblies respectively being charged and energizing the drive motor.

4. The combination of claim 3 including speed control means interconnecting the drive motor with the change-over switch device for varying the speed of the drive motor while energized by the other of the battery assemblies.

5. The combination of claim 3 wherein said switch actuating means includes a timer.

6. The combination of claim 3 including speed control means connected to the drive motor for increasing the speed thereof from a lower limit, and means interconnecting the speed control means with the coast control means for enabling the auxiliary generator only at said lower limit of the drive motor speed.

* * * * *